United States Patent
Mastrocola et al.

(10) Patent No.: US 10,742,078 B2
(45) Date of Patent: Aug. 11, 2020

(54) VARIABLE TORQUE ELECTRIC MOTOR ASSEMBLY

(71) Applicant: Hamilton Sundstrand Corporation, Charlotte, NC (US)

(72) Inventors: Naison E. Mastrocola, Goshen, CT (US); Richard A. Poisson, Avon, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 462 days.

(21) Appl. No.: 15/794,144

(22) Filed: Oct. 26, 2017

(65) Prior Publication Data
US 2019/0131830 A1 May 2, 2019

(51) Int. Cl.
*H02K 21/04* (2006.01)
*H02K 1/18* (2006.01)
*H02P 25/22* (2006.01)
*H02P 25/03* (2016.01)
(Continued)

(52) U.S. Cl.
CPC .............. *H02K 1/185* (2013.01); *H02K 7/006* (2013.01); *H02K 7/125* (2013.01); *H02K 15/03* (2013.01);
(Continued)

(58) Field of Classification Search
CPC ......... G01N 2333/195; G01N 33/6803; H02K 15/03; H02K 1/185; H02K 21/145; H02K 41/033; H02K 7/006; H02K 7/125; H02P 21/0089; H02P 2207/03; H02P 2207/05; H02P 25/03; H02P 25/22; H02P 27/06; H02P 29/032; H02P 5/74
See application file for complete search history.

(56) References Cited

U.S. PATENT DOCUMENTS

| 4,713,570 A | 12/1987 | Mastromattei |
| 6,239,566 B1 | 5/2001 | Tareilus et al. |

(Continued)

FOREIGN PATENT DOCUMENTS

| EP | 2019473 A1 | 1/2009 |
| EP | 2782226 A2 | 9/2014 |

OTHER PUBLICATIONS

European Search Report for Application No. 18201963.8-1202 dated Feb. 25, 2019, 6 pages.
(Continued)

*Primary Examiner* — Muhammad S Islam
(74) *Attorney, Agent, or Firm* — Cantor Colburn LLP

(57) ABSTRACT

An electric motor assembly includes a primary electric motor including a primary rotor assembly and a primary stator assembly configured to be actuated to cause the primary rotor assembly to rotate based on an amount of magnetic flux in the rotor assembly. The assembly also includes a secondary electric motor including a secondary rotor assembly and a secondary stator assembly and a controllable magnetic device coupled to at least one of the primary rotor assembly and the secondary rotor assembly. The assembly also includes a controller configured to actuate the secondary electric motor based on a failure of the primary electric motor, and apply electric current to the controllable magnetic device to reduce back electromotive force (BEMF) caused by rotation of the primary rotor assembly during actuation of the secondary electric motor.

20 Claims, 5 Drawing Sheets

(51) Int. Cl.

| | | |
|---|---|---|
| *H02P 5/74* | (2006.01) | |
| *H02P 29/032* | (2016.01) | |
| *H02P 21/00* | (2016.01) | |
| *H02K 7/00* | (2006.01) | |
| *H02K 7/12* | (2006.01) | |
| *H02K 15/03* | (2006.01) | |
| *H02K 21/14* | (2006.01) | |
| *H02K 41/03* | (2006.01) | |
| *H02P 27/06* | (2006.01) | |

(52) U.S. Cl.
CPC ......... *H02K 21/145* (2013.01); *H02K 41/033* (2013.01); *H02P 5/74* (2013.01); *H02P 21/0089* (2013.01); *H02P 25/03* (2016.02); *H02P 25/22* (2013.01); *H02P 27/06* (2013.01); *H02P 29/032* (2016.02); *H02P 2207/03* (2013.01); *H02P 2207/05* (2013.01)

(56) References Cited

U.S. PATENT DOCUMENTS

| | | | |
|---|---|---|---|
| 6,777,838 B2 * | 8/2004 | Miekka | H02K 3/18 310/67 R |
| 8,076,882 B2 | 12/2011 | Dooley et al. | |
| 2003/0057784 A1 * | 3/2003 | Kanebako | F16C 32/0459 310/90.5 |
| 2010/0201294 A1 | 8/2010 | Yuuki et al. | |

OTHER PUBLICATIONS

Jiang, Xuefeng et al. "Electric Drive System of Dual-Winding Fault-Tolerant Permanent-Magnet Motor for Aerospace Applications", IEEE Transactions on Industrial Electronics, vol. 62, No. 12, Dec. 2015. 9 pages.

\* cited by examiner

VARIABLE TORQUE ELECTRIC MOTOR ASSEMBLY

BACKGROUND OF THE INVENTION

The subject matter disclosed herein relates to electric machines. More specifically, the subject disclosure relates to magnetic flux regulation of electric machines.

Many electrical actuators employ a DC electric motor, such as a Permanent Magnet DC Motor (PMDCM) to move a surface or object. Typically, the size of the actuator is related to the available power that must be delivered. In some cases, electrical actuators are needed to be able to deliver maximum power under a wide range of conditions and faults.

A PMDCM is limited in power by the available flux developed by the magnets on the rotor of the motor. In conventional PMDCMs, the magnetic field strength dictates the size of the rotor, because the rotor holds the permanent magnet(s). The higher the power, the more magnetic flux is needed, either through larger size or stronger magnets.

BRIEF DESCRIPTION OF THE INVENTION

According to one aspect of the invention an electric motor assembly that includes a primary electric motor including a primary rotor assembly and a primary stator assembly configured to be actuated to cause the primary rotor assembly to rotate based on an amount of magnetic flux in the rotor assembly is disclosed. The motor also includes: a secondary electric motor including a secondary rotor assembly and a secondary stator assembly; a controllable magnetic device coupled to at least one of the primary rotor assembly and the secondary rotor assembly; and a controller configured to actuate the secondary electric motor based on a failure of the primary electric motor, and apply electric current to the controllable magnetic device to reduce back electromotive force (BEMF) caused by rotation of the primary rotor assembly during actuation of the secondary electric motor.

According to any aspect disclosed herein, the primary rotor assembly and the secondary rotor assembly are configured to rotate synchronously.

According to any aspect disclosed herein, the controllable magnetic device includes a first controllable magnetic device coupled to the primary rotor assembly and a second controllable magnetic device coupled to the secondary.

According to any aspect disclosed herein, the controllable magnetic device is configured to be actuated to weaken a magnetic field generated by a permanent magnet in the primary rotor assembly during actuation of the secondary electric motor.

According to any aspect disclosed herein, the rotor assembly is connected to an actuator, and the controller is configured to increase an amount of torque generated by the secondary electric motor.

According to any aspect disclosed herein, the controller includes a field coupler coupled to the controllable magnetic device, the field coupler configured to be energized by stationary windings.

According to any aspect disclosed herein, the controller includes a rectifier device configured to convert alternating current generated by the field coupler to direct current and apply the direct current to the controllable magnetic device.

According to any aspect disclosed herein, the controllable magnetic device includes one or more windings coupled to the rotatable member.

According to any aspect disclosed herein, the primary rotor assembly includes a permanent magnet.

According to any aspect disclosed herein, wherein the rotor assembly and the stator assembly form at least part of a brushless direct current (DC) motor.

In one aspect, a method of controlling an electric motor assembly is disclosed. In this aspect the method includes: actuating a primary electric motor including a primary rotor assembly and a primary stator assembly, wherein actuating includes applying a first electric current to the primary stator assembly and causing the primary rotor assembly to rotate based on an amount of magnetic flux in the rotor assembly; based on a failure of the primary electric motor, actuating a secondary electric motor, the secondary electric motor including a secondary rotor assembly and a secondary stator assembly; and applying a second electric current by a controller to a controllable magnetic device coupled to at least one of the primary rotor assembly and the secondary rotor assembly, the second electric current causing the controllable magnetic device to reduce back electromotive force (BEMF) caused by rotation of the primary rotor assembly during actuation of the secondary electric motor.

According to any aspect disclosed herein, the primary rotor assembly and the secondary rotor assembly are configured to rotate synchronously.

According to any aspect disclosed herein, the controllable magnetic device includes a first controllable magnetic device coupled to the primary rotor assembly and a second controllable magnetic device coupled to the secondary.

According to any aspect disclosed herein, the second electric current is applied to the controllable magnetic device to weaken a magnetic field generated by a permanent magnet in the primary rotor assembly during actuation of the secondary electric motor.

According to any aspect disclosed herein, the rotor assembly is connected to an actuator, and the controller is configured to increase an amount of torque generated by the secondary electric motor.

According to any aspect disclosed herein, the controller includes a field coupler coupled to the controllable magnetic device, the field coupler configured to be energized by stationary windings.

According to any aspect disclosed herein, the controller includes a rectifier device configured to convert alternating current generated by the field coupler to direct current and apply the direct current to the controllable magnetic device.

According to any aspect disclosed herein, the controllable magnetic device includes one or more windings coupled to the rotatable member.

According to any aspect disclosed herein, the primary rotor assembly includes a permanent magnet.

According to any aspect disclosed herein, the rotor assembly and the stator assembly form at least part of a brushless direct current (DC) motor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Devices, systems and methods are provided herein for control of an electric motor. An embodiment of a motor assembly includes an electric motor (e.g., a permanent magnet DC motor) having a stator assembly and a rotor assembly. A controllable magnetic device is coupled to the rotor assembly and can be actuated and/or controlled to control an amount of magnetic flux in the rotor assembly. In one embodiment, the controllable magnetic device is an electromagnet formed by one or more windings that are mounted on a rotor shaft or otherwise coupled to the rotor assembly so that the windings rotate concurrently with the rotor assembly. The controllable magnetic device may be configured to increase the magnetic flux to, for example, increase the torque of the motor assembly and/or increase the power of an actuator coupled to the motor assembly. The controllable magnetic device can also be configured to decrease the magnetic flux.

In one embodiment, the controllable magnet device is incorporated into a primary motor and/or a secondary (backup or redundant) motor in a redundant motor topology. The secondary motor can be used to supplement the torque and power of the primary motor and/or be used in the event of a failure of the primary motor. The controllable magnetic device can be actuated to reduce the back electromotive force (BEMF) that can be generated by the failed primary motor when the secondary motor is in operation.

Figure 1:
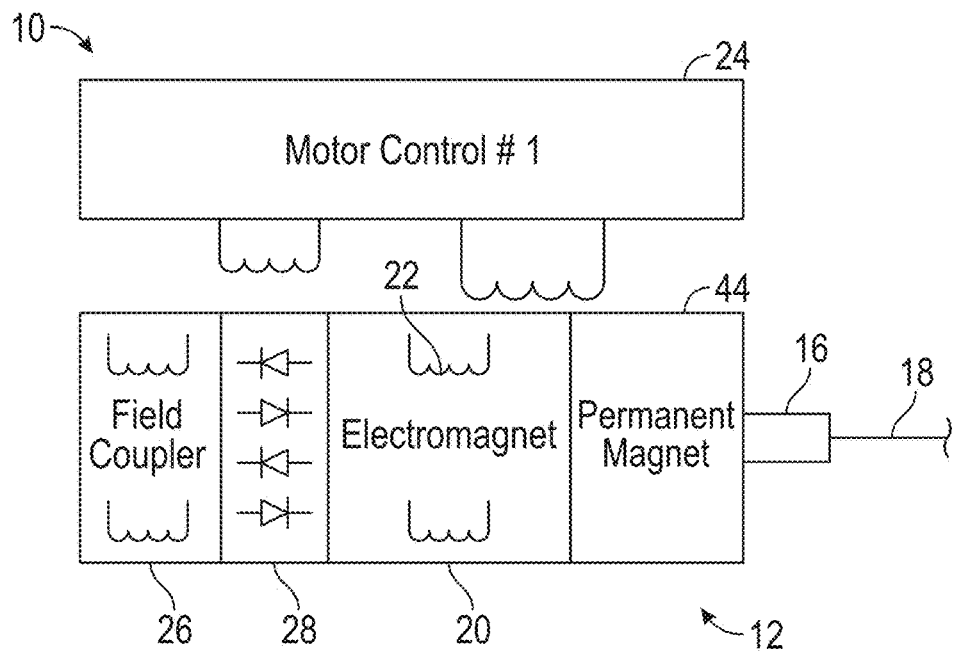
FIG. 1 depicts a rotor assembly of an embodiment of an electric motor assembly.

FIG. 1 illustrates aspects of an embodiment of an electric motor assembly, such as a permanent magnet DC (PMDC) motor assembly. The electric motor assembly 10 includes a stator assembly (not shown) and a rotor assembly 12. The rotor assembly 12 includes a permanent magnet 14 (or a plurality of permanent magnets) mounted on a rotor shaft 16 that extends longitudinally along a motor assembly axis 18. The permanent magnet 14 may be made of a rare-earth material or other suitable magnetic material. The rotor assembly 12 is configured to be disposed in a stator assembly (not shown), so that application of current to the stator assembly generates a current-induced magnetic field. The permanent magnet 14 couples with the current-induced magnetic field to cause rotation of the permanent magnet 14 and the rotor shaft 16.

The motor assembly 10 also includes a controllable magnetic device that is configured to adjust the magnetic flux density in the rotor assembly 12 (i.e., in the gap between the stator and rotor assemblies). In one embodiment, the controllable magnetic device is an electromagnet 20 formed by windings 22 mounted on the rotor assembly 12 so that the windings 22 rotate with the rotor assembly 12. A motor control device 24 controls the magnetic field generated by the electromagnet 20 via any suitable coupling device. The motor control device 24 includes components for performing functions related to control of the motor assembly 10 and the controllable magnetic device, such as a processor, a memory, a power supply, an input/output device and others.

In one embodiment, the motor assembly 10 includes a field coupler 26 connected to a conversion device 28. The field coupler 26 provides alternating current that is converted to a direct current. The direct current is then applied to the electromagnet 22 to adjust the magnetic field flux density in the rotor assembly 12.

The motor control device 24 and the electromagnet 20 provide a mechanism to vary the magnetic flux density in the air gap between the rotor and stator assemblies, thereby providing a variable flux motor assembly. By applying current in a first direction, the electromagnet 20 can generate a magnetic field that increases the magnetic flux density and thereby increases motor power. By applying current in a reverse direction, the electromagnet 20 can generate a magnet field that reduces the magnetic flux density (field weakening) and thereby reduces motor power.

By creating a controllable magnetic device or devices on the rotor assembly 12, the available flux of a brushless permanent magnet DC motor or other motor (e.g., a brushed motor) can be increased to gain power in critical envelopes of operation. The size of the motor assembly 10 can also be reduced (e.g., the size of a typical rare earth magnet rotor can be reduced) as the peak power required can be accommodated by the use of additive flux provided by the controllable magnetic device or devices.

Figure 2:
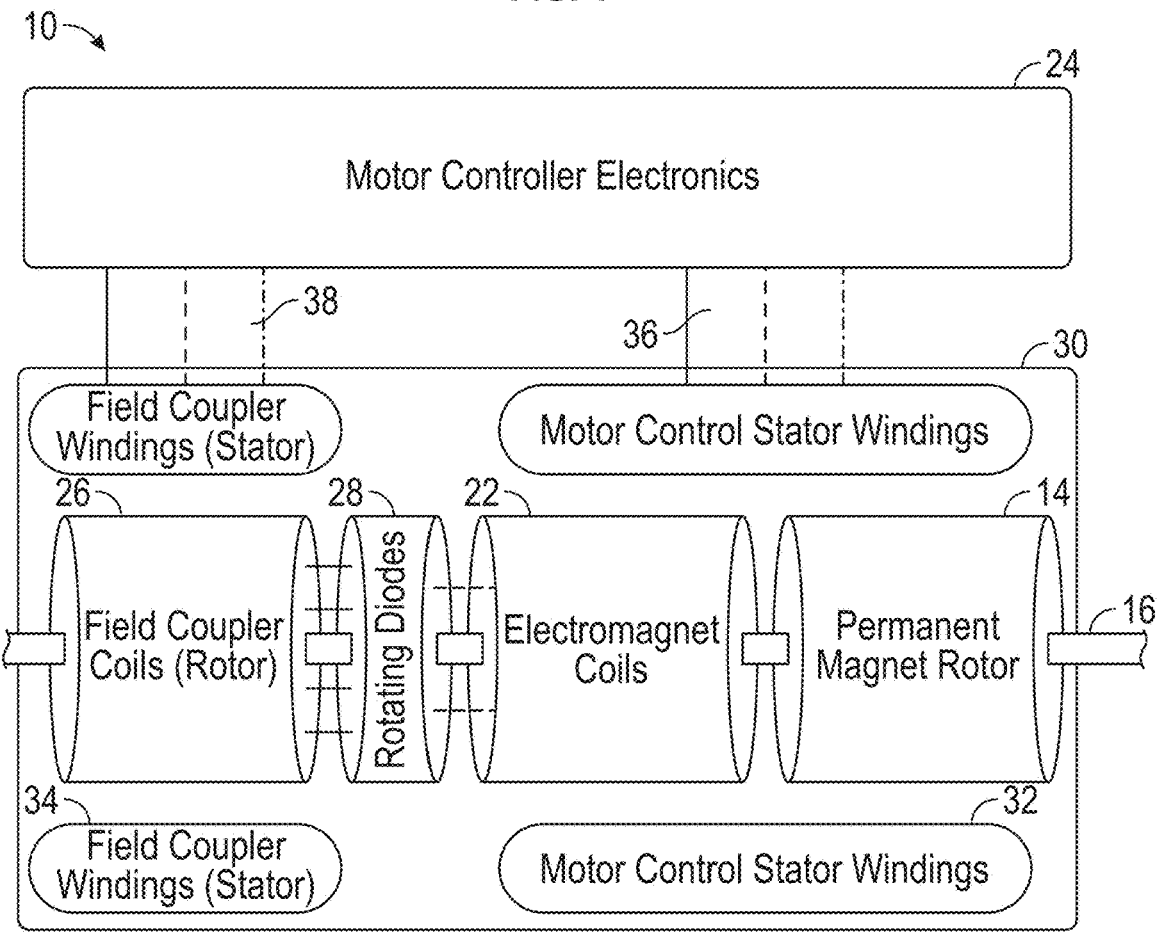
FIG. 2 depicts the electric motor assembly of FIG. 1 including the rotor assembly and a stator assembly.

FIG. 2 shows an example of the motor assembly 10, and illustrates an example of the field coupler 26 and the conversion device 28. In this example, the motor assembly 10 includes a stator assembly that is mounted in a stationary housing 30. The housing 30 may also house the permanent magnet 14, the electromagnet 20, the field coupler 26 and/or the conversion device 28. The stator assembly includes motor control stator windings 32 mounted in the housing 30.

In one embodiment, the field coupler 26 is configured to be inductively powered by stator windings 34, which may also be disposed in the housing 30. The field coupler 26 includes a plurality of windings or coils configured to rotate with the rotor assembly. The field coupler coils may be mounted on the rotor shaft 16, mounted on another shaft or member connected to the rotor shaft 16 or in any manner so that the field coupler coils rotate with the permanent magnet 14.

The controller 24 may be a single controller or other processing device, or may including multiple controllers that operate different components of the motor assembly 10. In the example of FIG. 2, the controller 24 is configured to control both the rotor assembly 12 and the electromagnet 20, and is operably connected to the stator windings 32 and the field coupler stator windings 34 by respective three-phase circuits 36 and 38.

In the example of FIG. 2, the conversion device 28 includes a plurality of rotating diodes configured to rotate with the rotor assembly 12. The rotating diodes act as a rectifier to convert AC current from the field coupler coils to DC current that is applied to the electromagnet 20.

Figure 3:
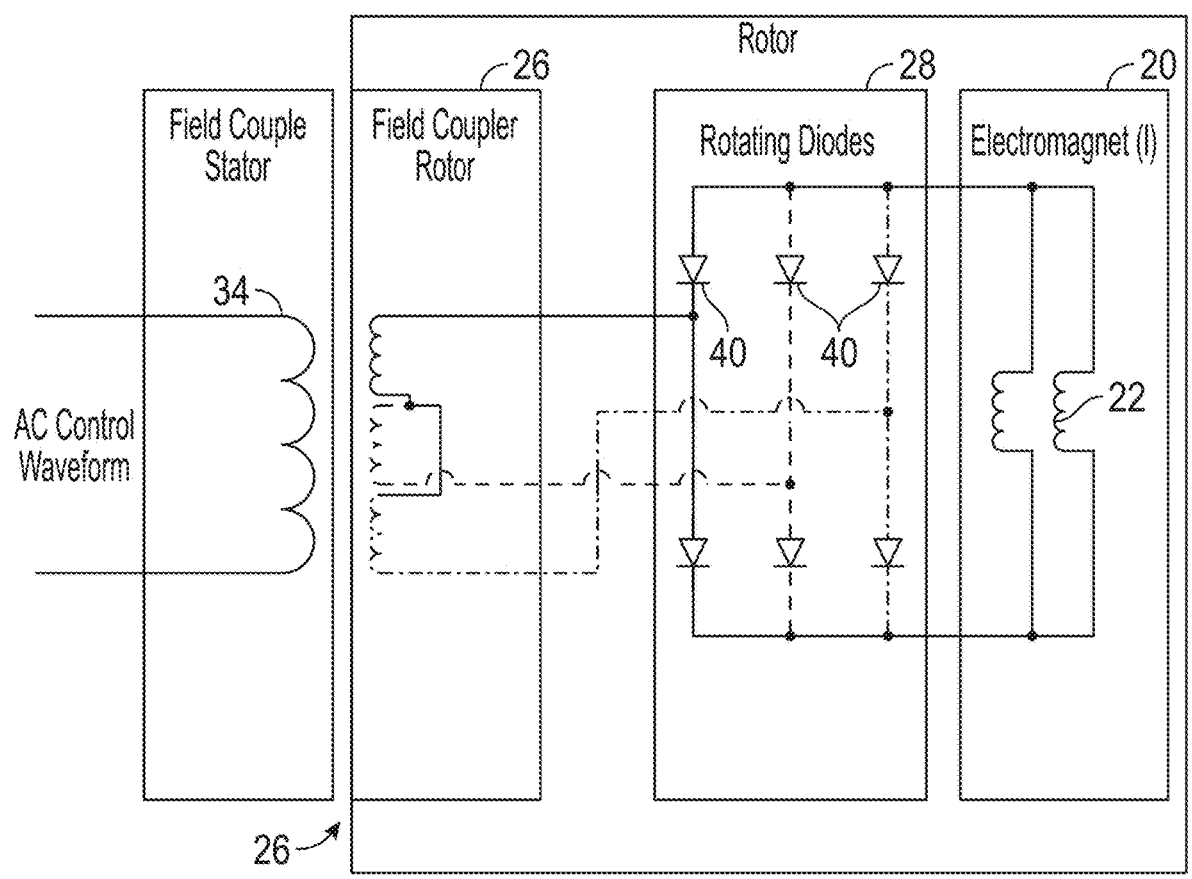
FIG. 3 depicts a rotor assembly of an embodiment of an electric motor assembly, which includes a field coupler connected to a controllable magnetic device by rotating diodes.

FIG. 3 is a schematic diagram of aspects of an embodiment of the motor assembly 10. In this embodiment, the electromagnet 20 is electrically connected to a series of rotating diodes 40 for each current phase, which convert the AC induced current into a DC current. This current is then used to energize the coils 22 of the electromagnet 20. As shown, the amount of current transferred from the field coupler 26 to the electromagnet 20 directly control the strength of the electromagnets affecting the total power of the motor assembly.

Figure 4:
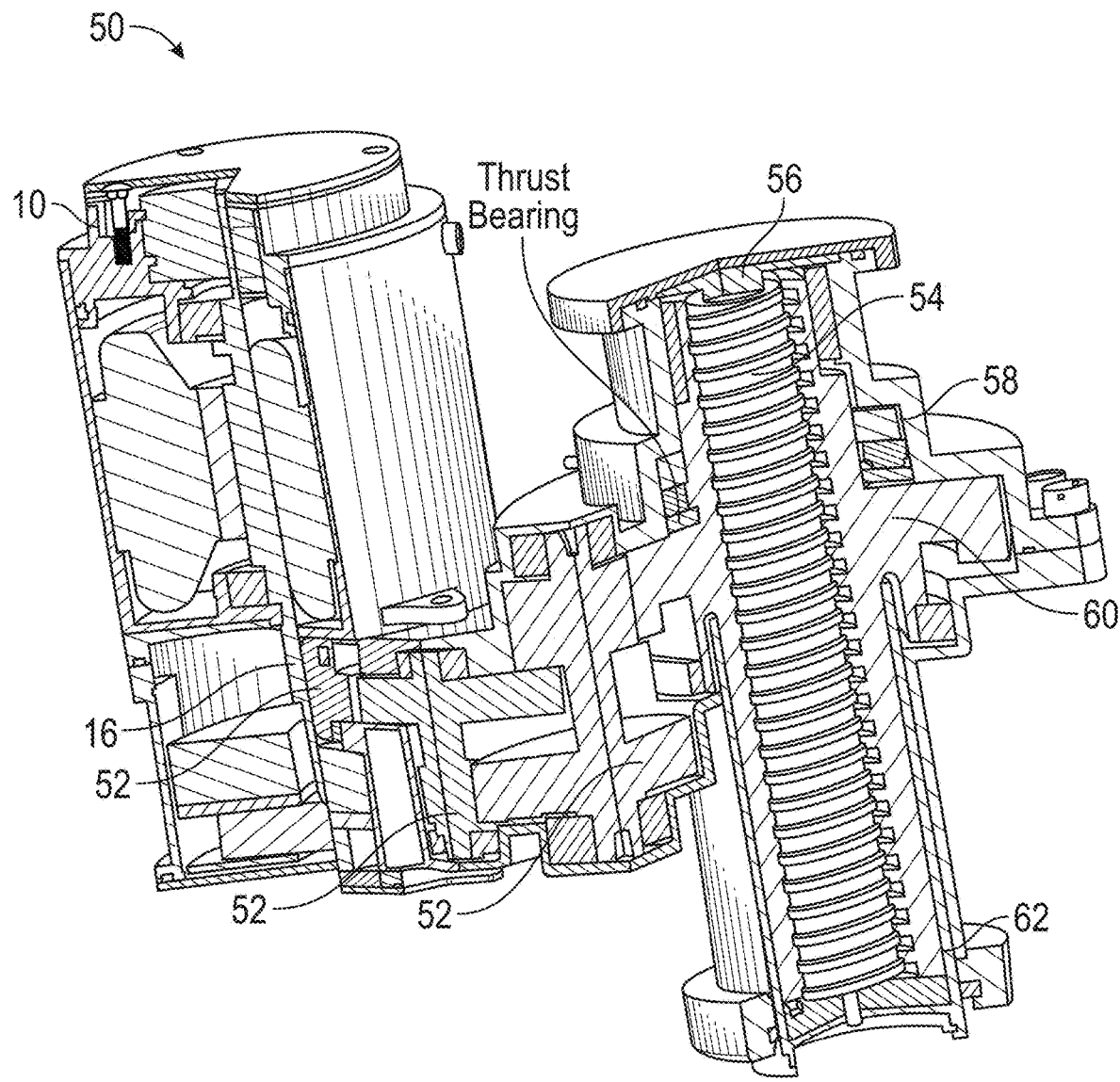
FIG. 4 depicts an embodiment of an actuator assembly including an electric motor assembly.

FIG. 4 shows an example of an actuator assembly 50 that can incorporate the motor assembly 10. The actuator assembly 50 may be a linear actuator, a rotary actuator or any suitable type of actuator or other device that utilizes torque generated by the motor assembly 10. As discussed above, the electromagnet 20 can be energized to either strengthen or weaken the primary magnetic field generated by the stator windings 32 and the permanent magnet 14.

In this example, the rotor shaft 16 is connected via a gear train 52 to a ball screw 54 that is turned by the motor assembly to generate linear motion. The ball screw 54 can be coupled to an actuator rod or other mechanism for moving an object or surface. The actuator assembly includes various other components, such as but not limited to, an internal anti-rotation post 56, load cell 58, a ball nut 60 and a seal tube 62.

Figure 5:
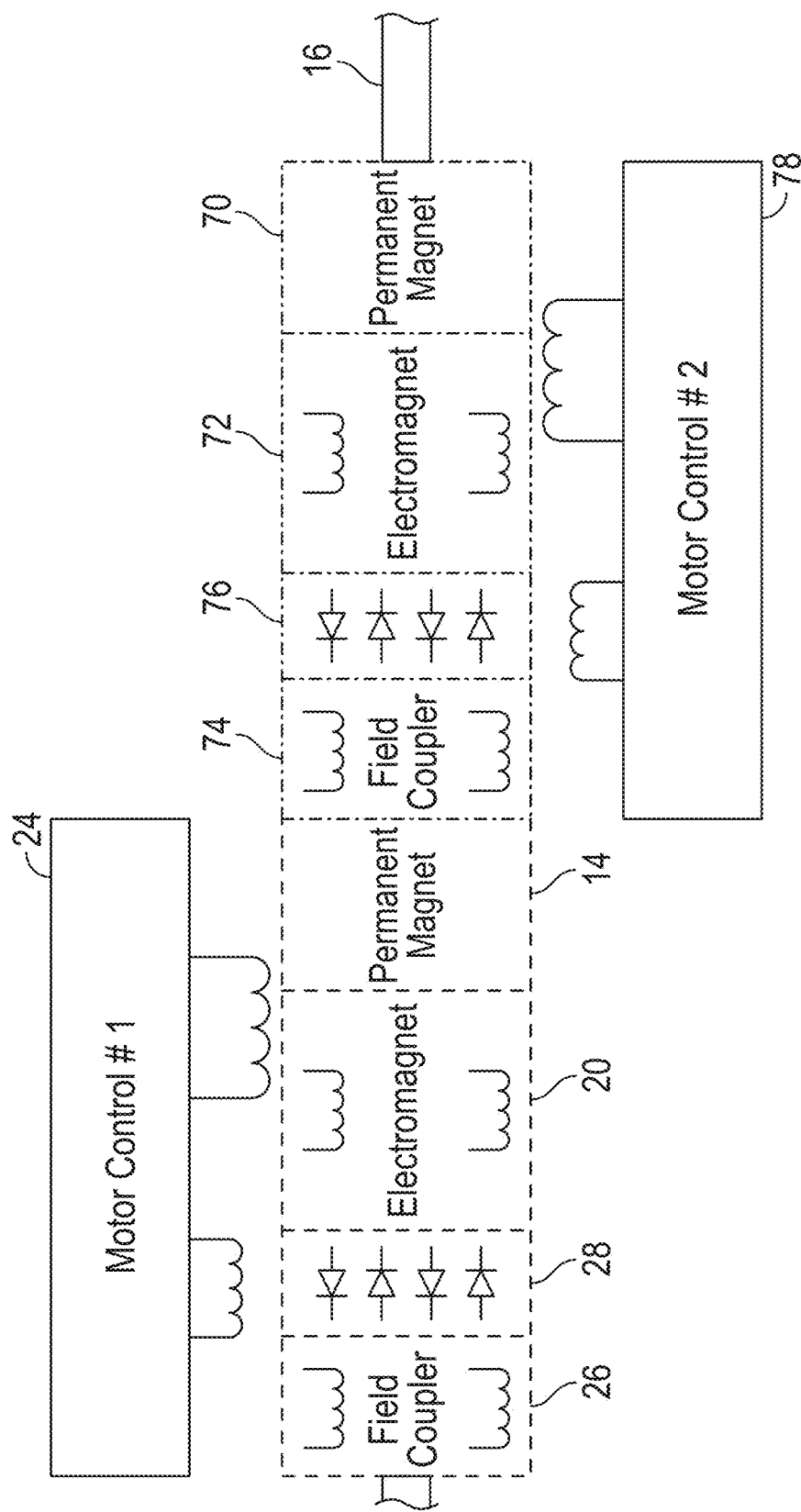
FIG. 5 depicts an embodiment of an electric motor system having a primary electric motor and a redundant secondary electric motor.
Figure 6:
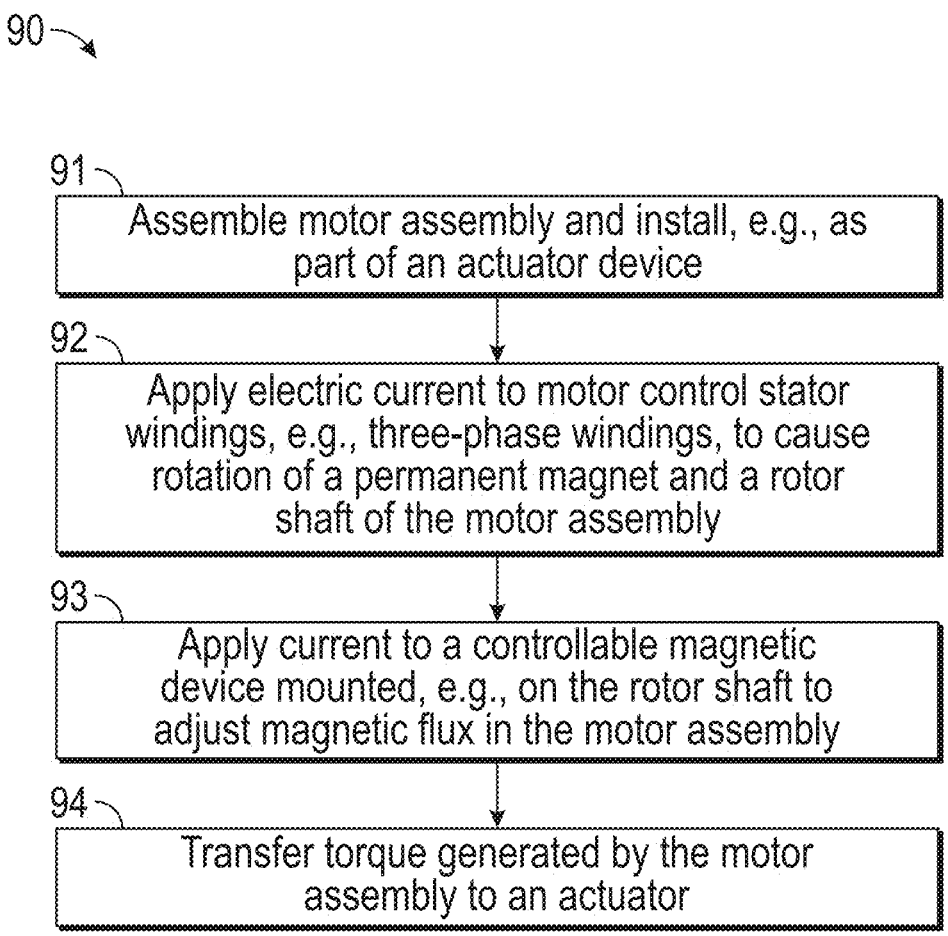
FIG. 6 is a flow diagram depicting an embodiment of manufacturing and/or operating an electric motor assembly.

Referring to FIG. 5, in one embodiment, the rotor assembly 12 is incorporated into redundant motor topography, in which the rotor assembly 12 forms part of a primary motor that is used, e.g., to control an actuator. A secondary motor is operably connected to the primary motor, e.g., by a common rotor shaft or by respective rotor shafts joined with a differential. Sharing a common shaft can be useful for, e.g., weight reduction.

In this embodiment, the primary motor includes the permanent magnet 14, the electromagnet 20, the conversion device 28 and the field coupler 26. The secondary motor includes a secondary permanent magnet 70 and may also include a controllable magnetic device such as a secondary electromagnet 72, which can be operably connected to a secondary field coupler 74 via a conversion device 76. The primary and secondary motors may be controlled via a single controller 24, or by separate controllers. For example, the primary motor is controlled by the controller 24 and the secondary motor is independently controlled by a secondary controller 78.

The secondary motor can be activated in the event of a failure of the primary motor or other condition for which the primary motor is insufficient for a given application. When the secondary motor is in use, the permanent magnet 14 of the primary motor produces a back electromotive force (BEMF) which can impede movement of the secondary motor. To reduce or eliminate the BEMF, the electromagnet 20 and/or the electromagnet 74 can be actuated and controlled to generate a magnetic field that reduces or eliminates the BEMF. In this way, in a dual redundant motor system, a failed motor can be effectively disengaged so that motors do not have to be sized up to drive through the BEMF.

FIG. 5 illustrates a method 90 of manufacturing and/or operating an electric motor. The method 90 is discussed in conjunction with the motor assembly 10 and the rotor assembly 12, although the method 90 may be utilized in conjunction with any suitable device or system that can utilize an electric motor. The method 90 includes one or more stages 91-94. In one embodiment, the method 90 includes the execution of all of stages 91-94 in the order described. However, certain stages may be omitted, stages may be added, or the order of the stages changed.

In the first stage 91, the motor assembly 10 is assembled and installed as part of, e.g., an actuator device, e.g., the actuator assembly 50. For example, the actuator assembly 50 is installed as part of an aircraft control system and is controlled by a pilot, operator and/or processing device (e.g., aircraft computer).

In the second stage 91, electric current is applied to the motor control stator windings 32, e.g., via three-phase current. The electric current flows circumferentially through the windings 32 around the permanent magnet 14, causing rotation of the permanent magnet 14 and the rotor shaft 16.

In the third stage 93, a controllable magnet such as the electromagnet 20 is actuated and controlled as discussed above. For example, the electromagnet 20 is energized by applying DC current via the field coupler 26 and the conversion device. The electromagnet 20 generates a magnetic field that interacts with the magnetic field in the rotor assembly 12 to either increase the magnetic flux density in the rotor assembly 12 or decrease the magnetic flux density.

In the fourth stage 94, the torque generated by the assembly 10 may be transferred or translated to an actuator. The actuator may be a linear actuator and/or a rotary actuator used in an aircraft or in any other suitable environment. For example, the torque is transferred to a component, e.g., an aileron or other moveable component of an aircraft. Other examples of the component include any moveable component or load (e.g., a pump).

Embodiments described herein provide a number of advantages and technical effects. The motor assemblies described herein provide an electric motor assembly and/or an electric actuator that can change its performance curves to match the needs of a system more closely than conventional motors and actuators, and thus be more efficient relative to conventional motors and actuators, while being more fault tolerant of environment conditions and degraded components. In addition, the embodiments can produce a relatively high power density without having to increase the size of an electric motor or actuator and/or require stronger and more costly magnets.

Modern aircraft are becoming more electric in an effort to reduce weight and increase performance. Many aircraft systems in safety critical functions involve full redundancy to achieve required safety levels. There are several disadvantageous of such an architecture including high weight and cost.

Embodiments described herein allow for the construction of motor assemblies that do not require full redundancy while satisfying desired safety criteria. For example, a conventional technique of redundancy reduction includes ganging lower reliability components together (such as a motor) to a single high reliability function (such as a linkage or pump). To do this, one must ensure that when a motor fails it does not inhibit other components. In the case of motors, this is accomplished through torque summing or disengagement clutches or release mechanisms, which adds weight cost and complexity back. By using a motor assembly with active field generation used to counteract permanent magnets as described herein, a clutch or other mechanism is not needed.

As the use of electric motors becomes more prevalent in aircraft, the need for a variable power motor is also growing. Sizing a motor for peak loads that may be seen only during a small part (e.g., 5%) of the total operating time imposes a huge burden on the size and cost of the motor. Embodiments described herein provide the ability to supplement a motor's native power without having to significantly increase the size or cost of the motor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electric motor assembly comprising:
   a primary electric motor including a primary rotor assembly and a primary stator assembly configured to be actuated to cause the primary rotor assembly to rotate based on an amount of magnetic flux in the rotor assembly;
   a secondary electric motor including a secondary rotor assembly and a secondary stator assembly;
   a controllable magnetic device coupled to at least one of the primary rotor assembly and the secondary rotor assembly; and
   a controller configured to actuate the secondary electric motor based on a failure of the primary electric motor, and apply electric current to the controllable magnetic device to reduce back electromotive force (BEMF) caused by rotation of the primary rotor assembly during actuation of the secondary electric motor.

2. The electric motor assembly of claim 1, wherein the primary rotor assembly and the secondary rotor assembly are configured to rotate synchronously.

3. The electric motor assembly of claim 1, wherein the controllable magnetic device includes a first controllable magnetic device coupled to the primary rotor assembly and a second controllable magnetic device coupled to the secondary.

4. The electric motor assembly of claim 1, wherein the controllable magnetic device is configured to be actuated to weaken a magnetic field generated by a permanent magnet in the primary rotor assembly during actuation of the secondary electric motor.

5. The electric motor assembly of claim 1, wherein the rotor assembly is connected to an actuator, and the controller is configured to increase an amount of torque generated by the secondary electric motor.

6. The electric motor assembly of claim 1, wherein the controller includes a field coupler coupled to the controllable magnetic device, the field coupler configured to be energized by stationary windings.

7. The electric motor assembly of claim 6, wherein the controller includes a rectifier device configured to convert alternating current generated by the field coupler to direct current and apply the direct current to the controllable magnetic device.

8. The electric motor assembly of claim 1, wherein the controllable magnetic device includes one or more windings coupled to the rotatable member.

9. The electric motor assembly of claim 1, wherein the primary rotor assembly includes a permanent magnet.

10. The electric motor assembly of claim 9, wherein the rotor assembly and the stator assembly form at least part of a brushless direct current (DC) motor.

11. A method of controlling an electric motor assembly comprising:
    actuating a primary electric motor including a primary rotor assembly and a primary stator assembly, wherein actuating includes applying a first electric current to the primary stator assembly and causing the primary rotor assembly to rotate based on an amount of magnetic flux in the rotor assembly;
    based on a failure of the primary electric motor, actuating a secondary electric motor, the secondary electric motor including a secondary rotor assembly and a secondary stator assembly; and
    applying a second electric current by a controller to a controllable magnetic device coupled to at least one of the primary rotor assembly and the secondary rotor assembly, the second electric current causing the controllable magnetic device to reduce back electromotive force (BEMF) caused by rotation of the primary rotor assembly during actuation of the secondary electric motor.

12. The method of claim 11, wherein the primary rotor assembly and the secondary rotor assembly are configured to rotate synchronously.

13. The method of claim 11, wherein the controllable magnetic device includes a first controllable magnetic device coupled to the primary rotor assembly and a second controllable magnetic device coupled to the secondary.

14. The method of claim 11, wherein the second electric current is applied to the controllable magnetic device to weaken a magnetic field generated by a permanent magnet in the primary rotor assembly during actuation of the secondary electric motor.

15. The method of claim 11, wherein the rotor assembly is connected to an actuator, and the controller is configured to increase an amount of torque generated by the secondary electric motor.

16. The method of claim 11, wherein the controller includes a field coupler coupled to the controllable magnetic device, the field coupler configured to be energized by stationary windings.

17. The method of claim 16, wherein the controller includes a rectifier device configured to convert alternating current generated by the field coupler to direct current and apply the direct current to the controllable magnetic device.

18. The method of claim 11, wherein the controllable magnetic device includes one or more windings coupled to the rotatable member.

19. The method of claim 11, wherein the primary rotor assembly includes a permanent magnet.

20. The method of claim 19, wherein the rotor assembly and the stator assembly form at least part of a brushless direct current (DC) motor.

* * * * *